US007006949B2

(12) United States Patent
Moore

(10) Patent No.: US 7,006,949 B2
(45) Date of Patent: Feb. 28, 2006

(54) METHOD AND SYSTEM FOR COLLECTING TEMPERATURE DATA

(75) Inventor: David Allen Moore, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 69 days.

(21) Appl. No.: 10/766,360

(22) Filed: Jan. 27, 2004

(65) Prior Publication Data

US 2005/0165586 A1 Jul. 28, 2005

(51) Int. Cl.
*G06F 19/00* (2006.01)

(52) U.S. Cl. ...................................... 702/188; 374/132

(58) Field of Classification Search ................ 702/188, 702/182–185, 130; 374/170, 132
See application file for complete search history.

(56) References Cited

U.S. PATENT DOCUMENTS 4,379,483 A 4/1983 Farley
2003/0219062 A1 * 11/2003 Egidio ........................ 374/170
2004/0160897 A1 * 8/2004 Fowler et al. ............. 370/241

* cited by examiner

*Primary Examiner*—Edward Raymond

(57) ABSTRACT

A first aspect of the present invention is a method for collecting temperature data in a facility wherein the facility includes a plurality of systems. The method includes coupling a plurality of sensors to at least one of the plurality of systems, connecting each of the plurality of sensors to a central system and utilizing the central system to collect temperature data from each of the plurality of sensors.

8 Claims, 7 Drawing Sheets

METHOD AND SYSTEM FOR COLLECTING TEMPERATURE DATA

FIELD OF THE INVENTION

The present invention relates generally to cooling systems and particularly to a method and system for collecting temperature data.

BACKGROUND OF THE INVENTION

A data center may be defined as a location, e.g., a room, that houses numerous printed circuit (PC) board electronic systems arranged in a number of racks. A standard rack may be defined as an Electronics Industry Association (EIA) enclosure, 78 in. (2 meters) high, 24 in. (0.61 meter) wide and 30 in. (0.76 meter) deep. Standard racks may be configured to house a number of PC boards, e.g., about forty (40) PC server systems, with some existing configurations of racks being designed to accommodate up to 280 blade systems. The PC boards typically include a number of components, e.g., processors, micro-controllers, high speed video cards, memories, and the like, that dissipate relatively significant amounts of heat during the operation of the respective components. For example, a typical PC board comprising multiple microprocessors may dissipate approximately 250 W of power. Thus, a rack containing forty (40) PC boards of this type may dissipate approximately 10 KW of power.

The power required to remove the heat dissipated by the components in the racks is generally equal to about 10 percent of the power needed to operate the components. However, the power required to remove the heat dissipated by a plurality of racks in a data center is generally equal to about 50 percent of the power needed to operate the components in the racks. The disparity in the amount of power required to dissipate the various heat loads between racks and data centers stems from, for example, the additional thermodynamic processing needed in the data center to cool the air.

In one respect, racks are typically cooled with fans that operate to move cooling fluid, e.g., air, across the heat dissipating components; whereas, data centers often implement reverse power cycles to cool heated return air. The additional work required to achieve the temperature reduction, in addition to the work associated with moving the cooling fluid in the data center and the condenser, often add up to the 50 percent power requirement. As such, the cooling of data centers presents problems in addition to those faced with the cooling of racks.

Conventional data centers are typically cooled by operation of one or more air conditioning units. The compressors of the air conditioning units typically require a minimum of about thirty (30) percent of the required cooling capacity to sufficiently cool the data centers. The other components, e.g., condensers, air movers (fans), etc., typically require an additional twenty (20) percent of the required cooling capacity. As an example, a high density data center with 100 racks, each rack having a maximum power dissipation of 10 KW, generally requires 1 MW of cooling capacity.

Air conditioning units with a capacity of 1 MW of heat removal generally require a minimum of 300 KW input compressor power in addition to the power needed to drive the air moving devices, e.g., fans, blowers, etc. Conventional data center air conditioning units do not vary their cooling fluid output based on the distributed needs of the data center. Instead, these air conditioning units generally operate at or near a maximum compressor power even when the heat load is reduced inside the data center.

The substantially continuous operation of the air conditioning units is generally designed to operate according to a worst-case scenario. That is, cooling fluid is supplied to the components at around 100 percent of the estimated cooling requirement. In this respect, conventional cooling systems often attempt to cool components that may not need to be cooled. Consequently, conventional cooling systems often incur greater amounts of operating expenses than may be necessary to sufficiently cool the heat generating components contained in the racks of data centers.

Accordingly, what is needed is a method and system for collecting temperature data from the data center so that the computing equipment can be cooled based on actual cooling requirements. The method and system should be simple, inexpensive and capable of being easily adapted to existing technology. The present invention addresses these needs.

SUMMARY OF THE INVENTION

An aspect of the present invention is a method for collecting temperature data in a facility wherein the facility includes a plurality of systems. The method includes coupling a plurality of sensors to at least one of the plurality of systems, connecting each of the plurality of sensors to a central system and utilizing the central system to collect temperature data from each of the plurality of sensors.

Other aspects and advantages of the present invention will become apparent from the following detailed description, taken in conjunction with the accompanying drawings, illustrating by way of example the principles of the invention.

DETAILED DESCRIPTION

Figure 1:
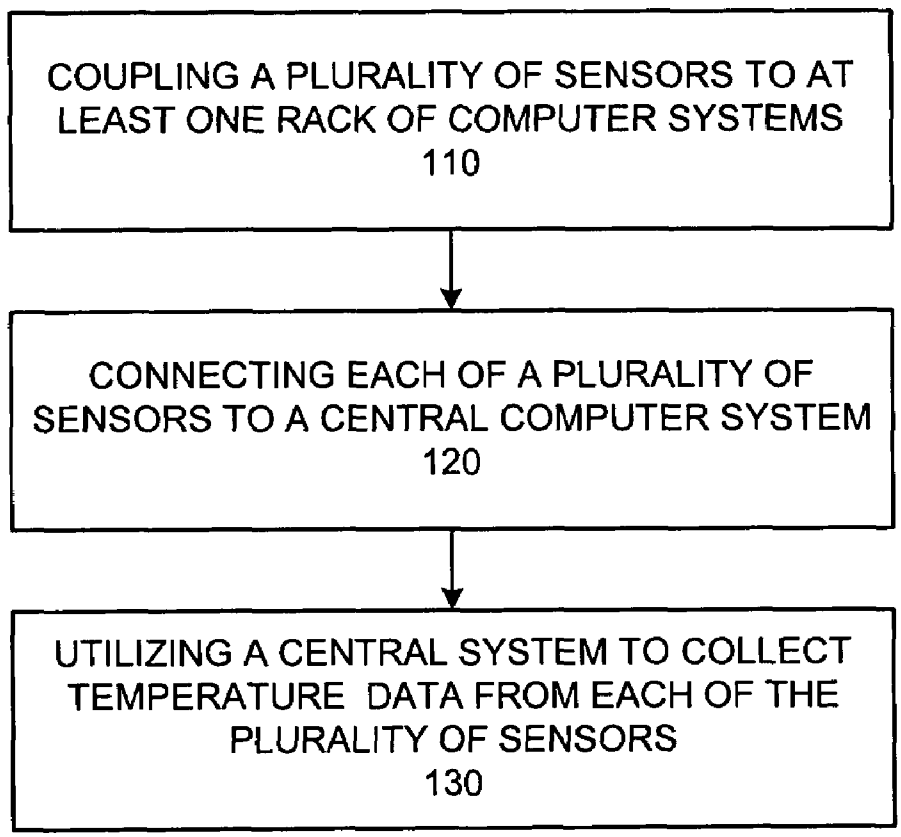
FIG. 1 is a high-level flow chart of a method in accordance with an embodiment of the present invention.

The present invention relates to a method and system for collecting temperature data. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiment shown but is to be accorded the widest scope consistent with the principles and features described herein.

As shown in the drawings for purposes of illustration, a method and system for collecting temperature data is shown. The method and system utilizes a plurality of temperature sensors, located at various locations throughout the data center, to dynamically collect temperature data at various locations within the data center. Accordingly, by dynamically collecting temperature data at various locations within the data center, the cooling resources of the data center can be allocated based on the actual cooling requirements of the data center. As a result of the use of the method and system, a substantial savings in operational costs related to the operation of the data center cooling resources is achieved.

FIG. 1 is a high level flow chart of a method for collecting temperature data. A first step 110 includes coupling a plurality of sensors to at least one rack of systems. A second step 120 includes connecting each of the plurality of sensors to a central computer system. A final step 130 includes utilizing the central system to collect temperature data from each of the plurality of sensors.

Although the above-described embodiment is disclosed in the context of being utilized in conjunction with a data center, one of ordinary skill in the art will readily recognize that the functionality of the varying embodiments of the present invention can be utilized in a variety of different facilities while remaining within the spirit and scope of the present invention.

Figure 2:
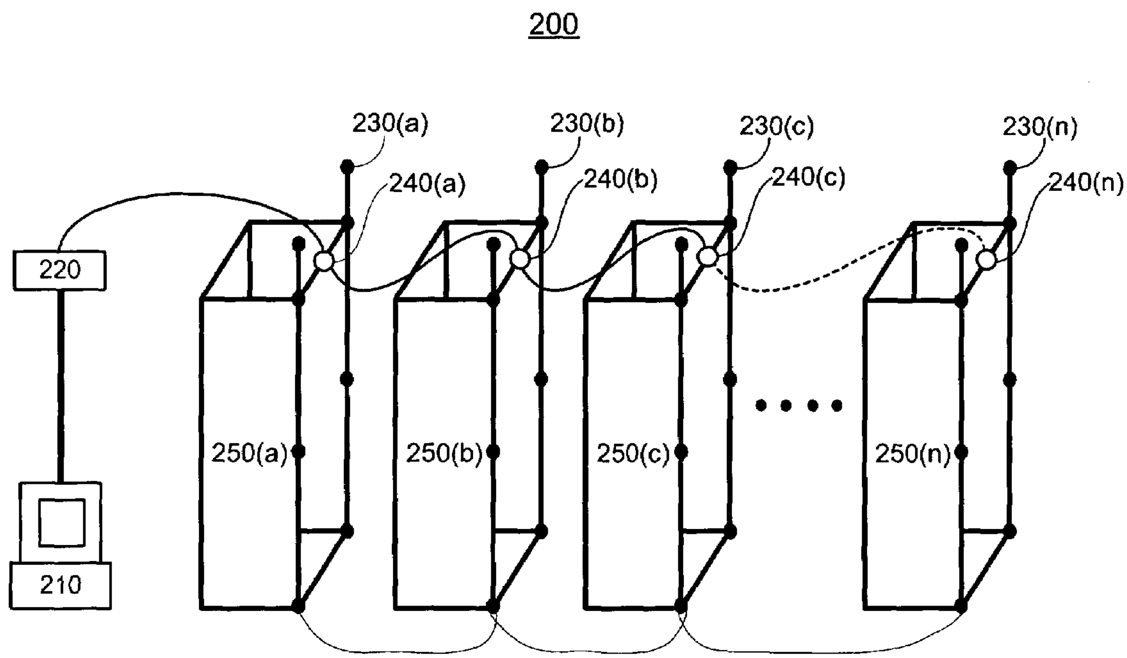
FIG. 2 is an illustration of a system in accordance with an embodiment of the present invention.

FIG. 2 is a high-level illustration of one example of a system 200 for collecting temperature data. In this particular environment, the system 200 is a data center. The system 200 includes a central computer system 210, a temperature-collection module 220, a plurality of computer racks 250(*a . . . n*) wherein each of the plurality of computer racks 250(*a . . . n*) includes a plurality of temperature sensors 230(*a . . . n*) and a connector board 240(*a . . . n*). The temperature-monitoring module 220 is coupled to at least one of the connector boards 240(*a . . . n*) and the central computer system 210.

Figure 3:
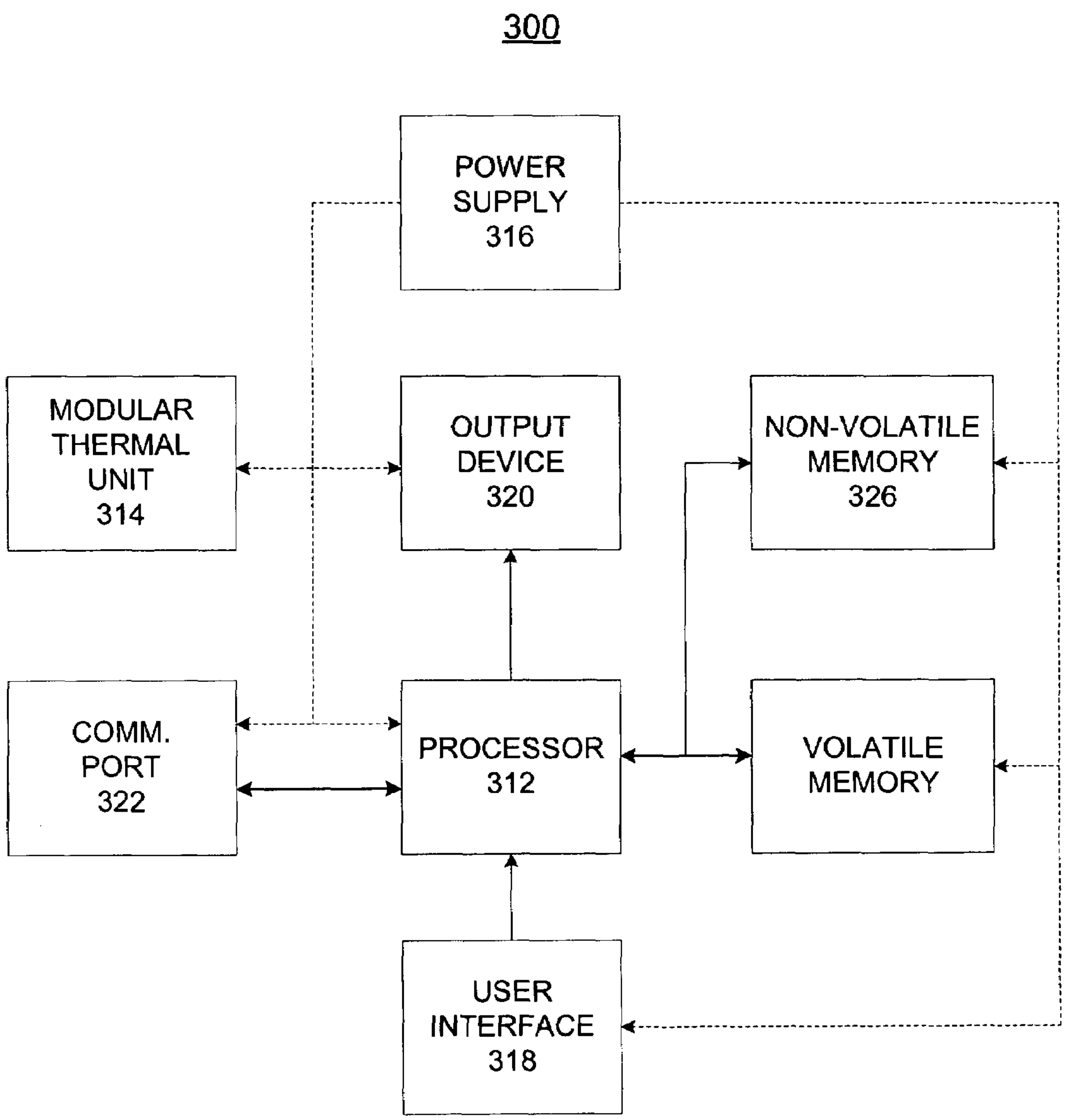
FIG. 3 is a block diagram of a computer system that could be utilized in conjunction with an embodiment of the present invention.

For an example of a central computer system, please refer to FIG. 3. In FIG. 3, a block diagram of a computer system 210, generally designated by the reference numeral 210, is featured. Computer 210 may be any of a variety of different types, such as a notebook computer, a desktop computer, an industrial personal computer, an embedded computer, etc. In the illustrated embodiment, a processor 312 controls the functions of computer system 210. In this embodiment, data, as illustrated by the solid line, is transferred between the processor 312 and the components of system 210. Additionally, a modular thermal unit 314 is used to remove heat from the processor 312. Computer 210 also includes a power supply 316 to supply electrical power, as illustrated by the dashed line, to the components of computer system 210. Additionally, power supply 316 may include a battery.

Computer system 210 may incorporate various other components depending upon the desired functions of computer 210. In the illustrated embodiment, a user interface 318 is coupled to processor 312. Examples of a user interface 318 include a keyboard, a mouse, and/or a voice recognition system. Additionally, an output device 320 is coupled to processor 312 to provide a user with visual information. Examples of an output device 320 include a computer monitor, a television screen, a printer or the like. In this embodiment a communications port 322 is coupled to processor 312 to enable the computer system 210 to communicate with an external device or system, such as a printer, another computer, or a network.

Processor 312 utilizes software programs to control the operation of computer 210. Electronic memory is coupled to processor 312 to store and facilitate execution of the programs. In the illustrated embodiment, processor 312 is coupled to a volatile memory 324 and non-volatile memory 326. A variety of memory types, such as DRAMs, SDRAMs, SRAMs, etc., may be utilized as volatile memory 324. Non-volatile memory 326 may include a hard drive, an optical storage, or another type of disk or tape drive memory. Non-volatile memory 326 may include a read only memory (ROM), such as an EPROM, to be used in conjunction with volatile memory 324.

The system 210 may also be utilized in conjunction with a distributed computing environment where tasks are performed by remote processing devices that are linked through a communications network. In a distributed computing environment, program modules may be located in both local and remote memory storage devices. Execution of the program modules may occur locally in a stand-alone manner or remotely in a client/server manner. Examples of such distributed computing environments include local area networks of an office, enterprise-wide computer networks, and the Internet. Additionally, the networks could communicate via wireless means or any of a variety of communication means while remaining within the spirit and scope of the present invention.

Referring back to FIG. 2, each of the plurality of computer racks 250(*a . . . n*) includes a plurality of temperature sensors 230(*a . . . n*). Since the temperature profile of air throughout the system 200 is typically non-uniform, multiple sensors are implemented to capture temperature data at multiple points. In an embodiment, eight temperature sensors are deployed in conjunction with each of the plurality of computer racks 250(*a . . . n*). As can be seen in FIG. 2, the plurality of sensors 230(*a*) includes 6 sensors along the side paneling of the computer rack 250(*a*) as well as 2 sensors displaced above the rack 250(*a*).

In an embodiment, computer rack 250(*a*) houses a plurality of components (not shown), e.g., processors, micro-controllers, high speed video cards, memories, semi-conductor devices, and the like. The components may be elements of a plurality of subsystems (not shown), e.g., computers, servers, etc. The subsystems and the components may be implemented to perform various electronic, e.g., computing, switching, routing, displaying, and the like, functions. In the performance of these electronic functions, the components, and therefore the subsystems, generally dissipate relatively large amounts of heat. Because computer rack systems have been generally known to include upwards of forty (40) or more subsystems, they may need substantially large amounts of cooling resources to maintain the subsystems and the components generally within a predetermined operating temperature range.

Additionally, the temperature of the cooling air supplied by the data center cooling system is likely to vary based on the distance between the cooling equipment and the computer rack 250(*a*). Accordingly, temperature readings associated with the operation of the computer rack 250(*a*) are gathered at multiple points in the vertical and horizontal directions.

Figure 4:
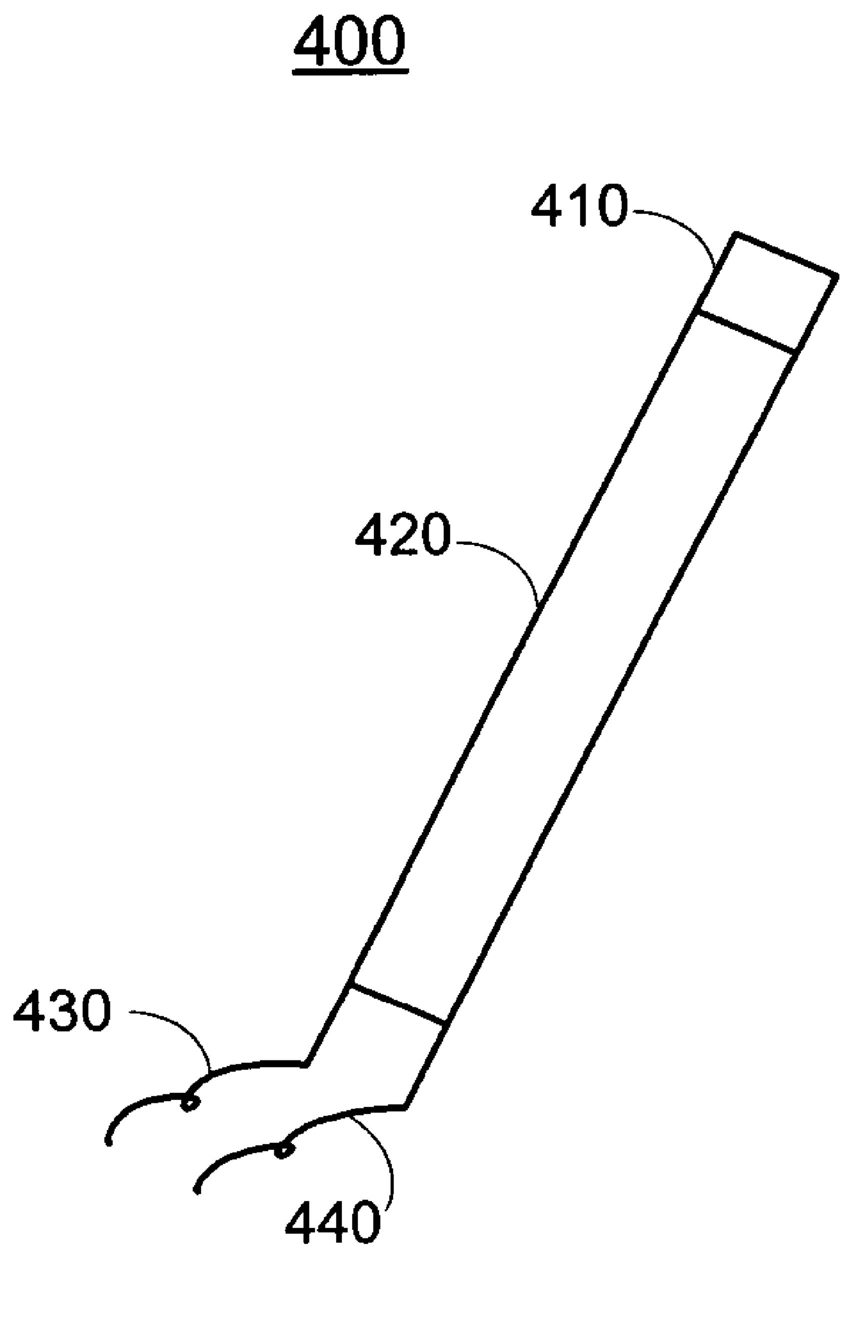
FIG. 4 shows an example of a sensor configuration that could be implemented in conjunction with an embodiment of the present invention.

Referring to each of the plurality of sensors 230(*a . . . n*), each sensor is a small device with at least two connection leads. One lead serves as a ground connection lead while the other is a data connection lead. FIG. 4 shows one example of a sensor configuration 400. The configuration 400 includes a temperature sensor 410 coupled to a flexible stalk 420. The configuration 400 also includes a ground connection lead 430 and a data connection lead 440 to be utilized to connect the sensor 410 to an electromechanical connector board. The ground connection lead 430 and the data connection lead 440 can be configured either in one long wire pair with multiple sensors in parallel or in a star arrangement with one sensor per wire pair.

In an embodiment, the temperature sensor 410 is a DS18S20-PAR sensor from Dallas Semiconductor/Maxim. Power is supplied by parasitically charging an internal capacitor during data line inactivity. The sensor 410 is mounted on a short, flexible stalk 420 and is configured to measure ambient temperature a small distance (e.g. 10 cm) from the rack. The flexible stalk 420 is made of a flexible material such as plastic tubing or the like.

An advantage of implementing these sensors is that a central instrument is not needed. Each sensor is capable of independently converting physical temperature data to transmittable digital data. This removes the need to carry sensitive analog signals from point to point. In an embodiment, the digital data is protected by CRC algorithms that prevent the distortion of the data.

Figure 5:
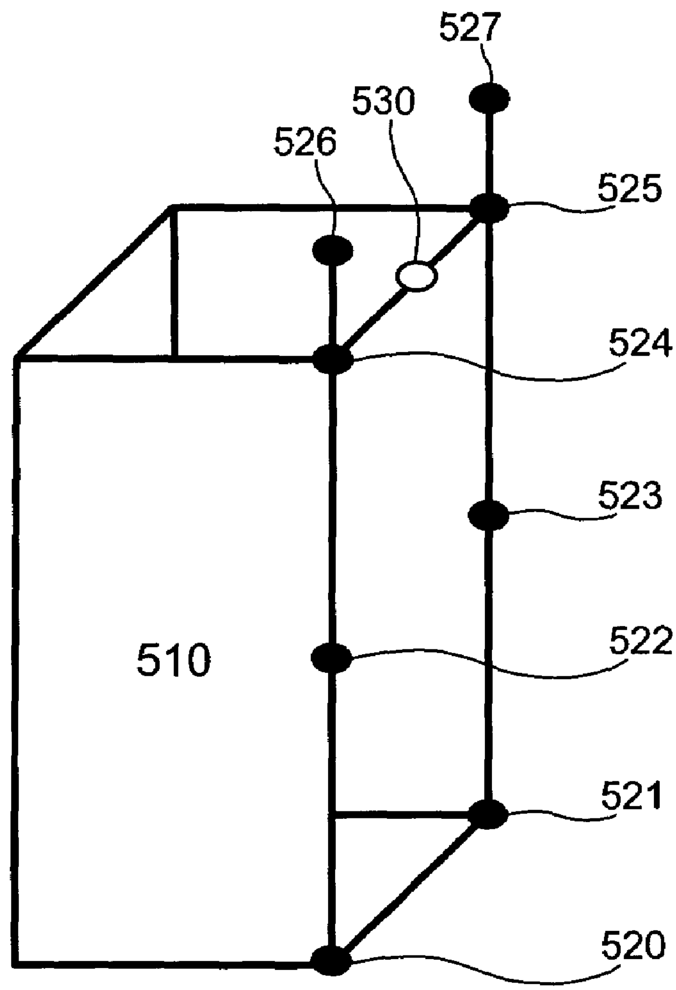
FIG. 5 shows a single computer rack configuration from FIG. 2 in conjunction with an embodiment of the present invention.
Figure 6:
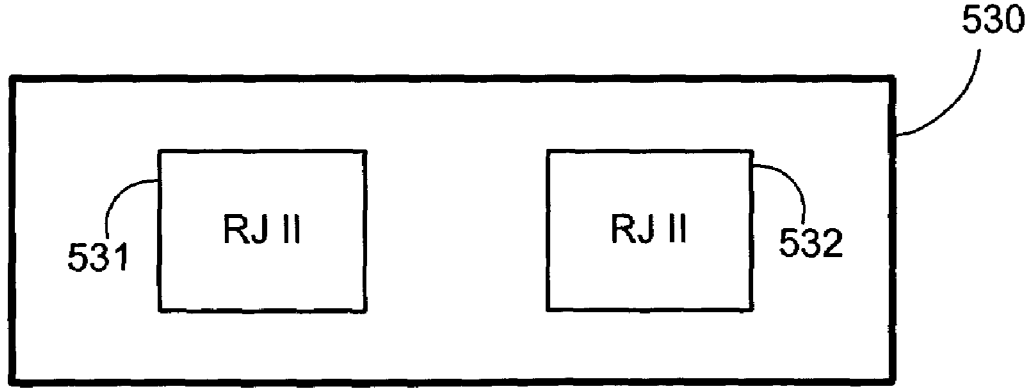
FIG. 6 shows a connector board in conjunction with an embodiment of the present invention.

As previously stated, in order to get an accurate profile of temperature conditions, 6 sensors are deployed along the side paneling of each computer rack and 2 sensors are deployed above the rack to measure the free stream air temperature above the rack. For a better understanding, please refer now to FIG. 5. FIG. 5 shows a single computer rack configuration 500. The configuration includes computer rack 510, an associated plurality of sensors 520–527 and an associated connector board 530. As can be seen in FIG. 5, the plurality of sensors 520–527 includes 6 sensors 520–525 that are deployed. 3 sensors 520, 522, 524 are deployed in front of the computer rack 510 and 3 sensors 521, 523, 525 are deployed in back of the rack 510. Additionally, overhead sensors 526, 527 are respectively deployed in the front and back of the computer rack 510. Each of the plurality of sensors 520–527 is connected to an electromechanical connector board 530. In the simplest configuration, the connector board 530 needs no power and serves as a connection point for each of the plurality of sensors and as well as a means for transmitting collected temperature data to the temperature collection module. FIG. 6 shows an example of the electromechanical connector board 530 that can be utilized in conjunction with an embodiment. The connector board 530 includes a first input port 531 and a second input port 532. Both the first input port 531 and the second input port 532 are configured to receive a ground line and a data line.

The ports 531, 532 can be RJ-11 phone line type ports or any of a variety of types of ports. The first data port 531 is configured to connect the connector board 530 to the temperature collection module or directly to the central computer system while the second data port 532 is configured to collect temperature data from the plurality of sensors 520–527. Additionally, the first data port 531 is configured to connect the connector board 530 to another connector thereby enabling multiple connector boards to be connected to a central computer system in a daisy chain fashion.

Figure 7:
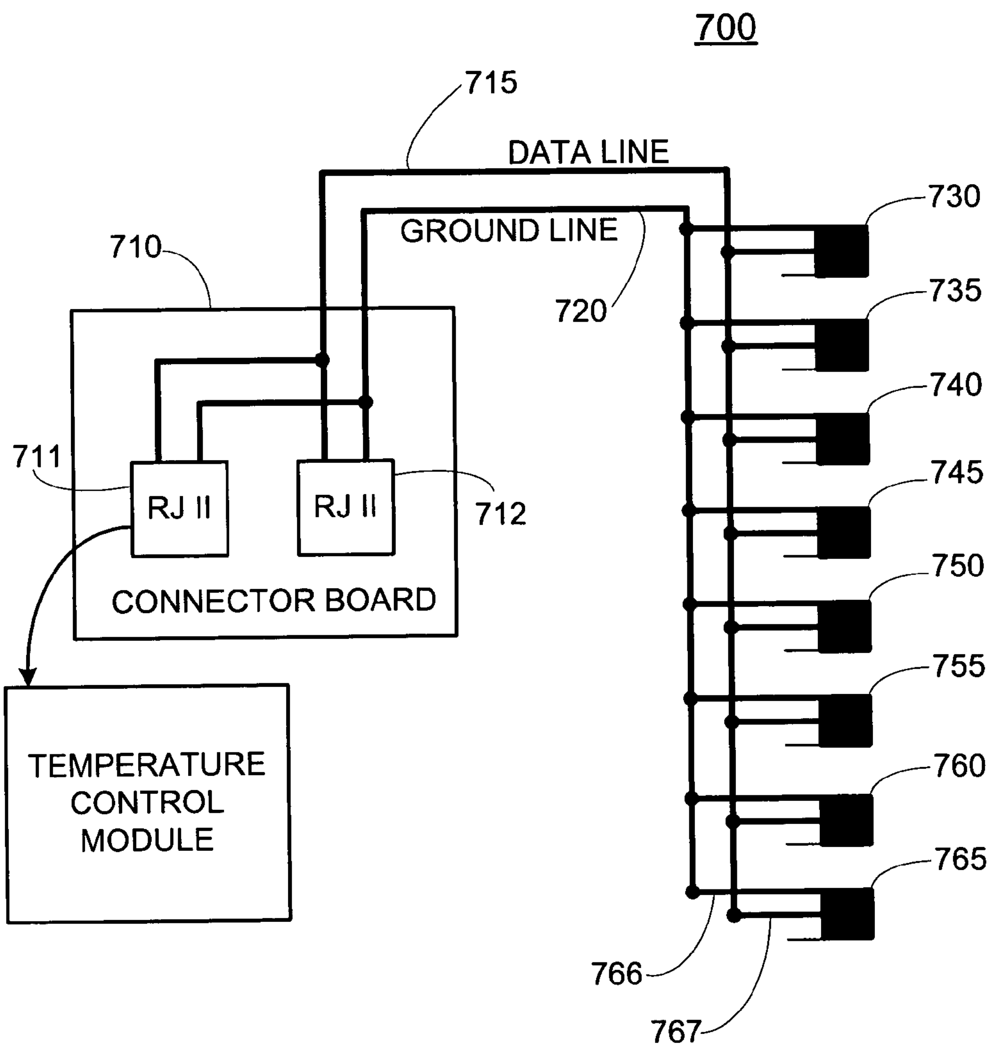
FIG. 7 shows a connection scheme that can be implemented in conjunction with an embodiment of the present invention.

FIG. 7 shows a connection scheme 700 that can be implemented in conjunction with an embodiment. The scheme 700 includes a connector board 710 and a plurality of temperature collection sensors 730–765. The connector board 710 includes a first RJ11 port 711 and a second RJ11 port 712. In an embodiment, each of the temperature collection sensors 730–765 is coupled to the first and second RJ11 ports 711, 712 via two lines: a data line 715 and a ground line 720. By way of example, temperature sensor 765 is connected to the first RJ11 port 711 and the second RJ11 port 712 via a ground connection lead 766 and a data line connection lead 767 wherein the ground connection lead 766 is coupled to the ground line 720 and the data connection lead 767 is coupled to the data line 715. The first RJ11 port 711 is connected to a temperature collection module.

As can be seen in FIG. 7, both the data line 715 and the ground line 720 are coupled to the first RJ11 port 711 and the second RJ11 port 712. As a result, the plurality of sensors 730–765 can be connected to the temperature collection module via two wires, the data line 715 and the ground line 720. This concept is advantageous with respect to conventional methodology in that conventional methodology requires a point to point connection from each sensor to a central data collection system. By employing the above-described concepts, multiple temperature sensors are coupled to a central data collection system (the temperature collection module) via the data line 715 and the ground line 720. This is substantially more efficient than the conventional methodology. Furthermore, these concepts allow the temperature sensors to be installed during production and connected together in the field. This is not possible with the conventional methodology.

Figure 8:
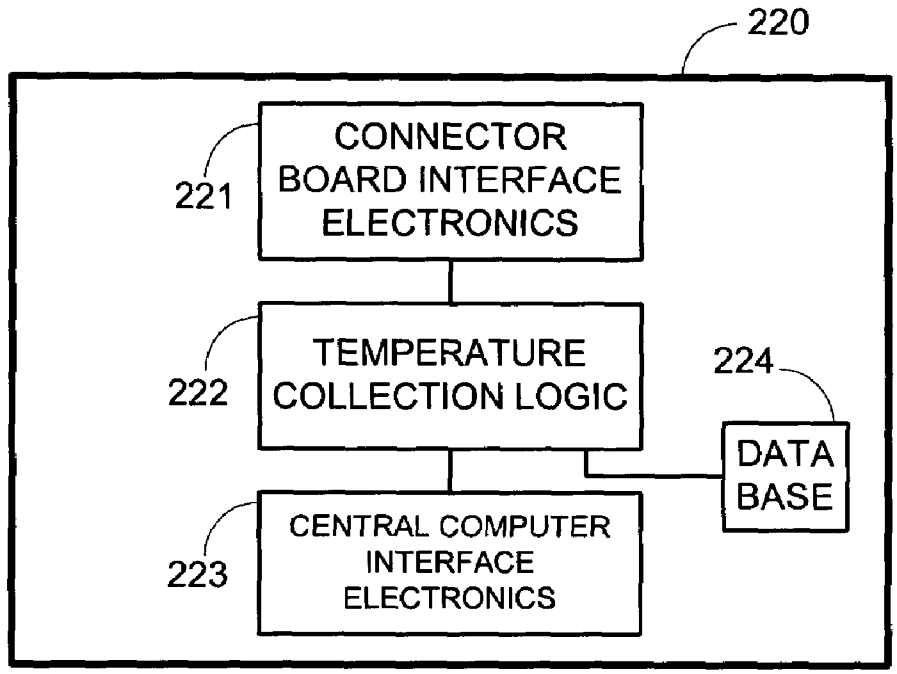
FIG. 8 shows a more detailed description of a temperature collection module that can be utilized in conjunction with an embodiment of the present invention.

Referring back to FIG. 2, the temperature collection module 220 is coupled to the central computer system 210 and at least one of connector boards 240(*a . . . n*). The temperature collection module 220 can be included in the central computer system 210 or can be configured in a device separate from the central computer system 210. In accordance with an embodiment, the temperature collection module 220 collects temperature data from each plurality of temperature sensors 230(*a . . . n*). FIG. 8 shows more detailed description of a temperature collection module 220 that can be utilized in conjunction with an embodiment.

The temperature collection module 220 includes connector board interface electronics 221, temperature collection logic 222 and central computer system interface electronics 223. The connector board interface electronics 221 are coupled to the temperature collection logic 222 wherein the temperature collection logic 222 is further coupled to the central computer system interface electronics 223. The temperature collection logic 222 is further coupled to temperature data table 224 that maintains the readings of the sensors 230(*a . . . n*).

Although the components of the above-described temperature collection module 220 are shown in a specific configuration, one of ordinary skill in the art will readily recognize the components of the temperature collection module 220 could be configured in a variety of ways while remaining within the spirit and scope of the present invention.

The temperature collection logic 222 periodically queries the data table 224 which contains the temperature readings of each plurality of the sensors 230(*a . . . n*). In order to access individual sensors it is necessary to know the address identifier of each of the individual sensors along with the physical location. This issue is complicated by the fact that the individual sensors are factory programmed with unique address information that is not re-programmable. However, this issue can be solved with the implementation of auto-configuration algorithms.

Additionally, in alternative embodiment, the temperature collection module 220 is implemented as a “row manager”

device. Accordingly, the module 220 is capable of communication with an Ethernet network connection while communicating with the plurality of sensors 230($a$ . . . $n$).

In accordance with an embodiment, a temperature data acquisition process begins with the periodic querying of each of the sensors in the data center, providing a "start conversion" command whereby the process of taking temperature readings from the individual sensors is initiated. This process takes approximately one second per sensor with parasitically powered devices. If faster results are needed, sensors are available with a separate power supply pin for a much faster response.

Once the temperature is measured from each sensor, the temperature collection logic 222 stores the temperature readings in the data table 224 and generates a temperature profile of the data center based on the temperature readings. Separate temperature tables can be generated based on the varying locations of sensors. For example, based on the location of the sensors temperature profiles can be generated for the front of rack, the back of the rack, etc.

In varying embodiments, the data center could employ more than one temperature collection module. In this case, the data table in each module will only contain part of the temperature profile of the data center. Accordingly, the central computer is can assemble partial profiles of the data center. These partial profiles can subsequently be combined to form a global temperature profile of the data center.

Figure 9:
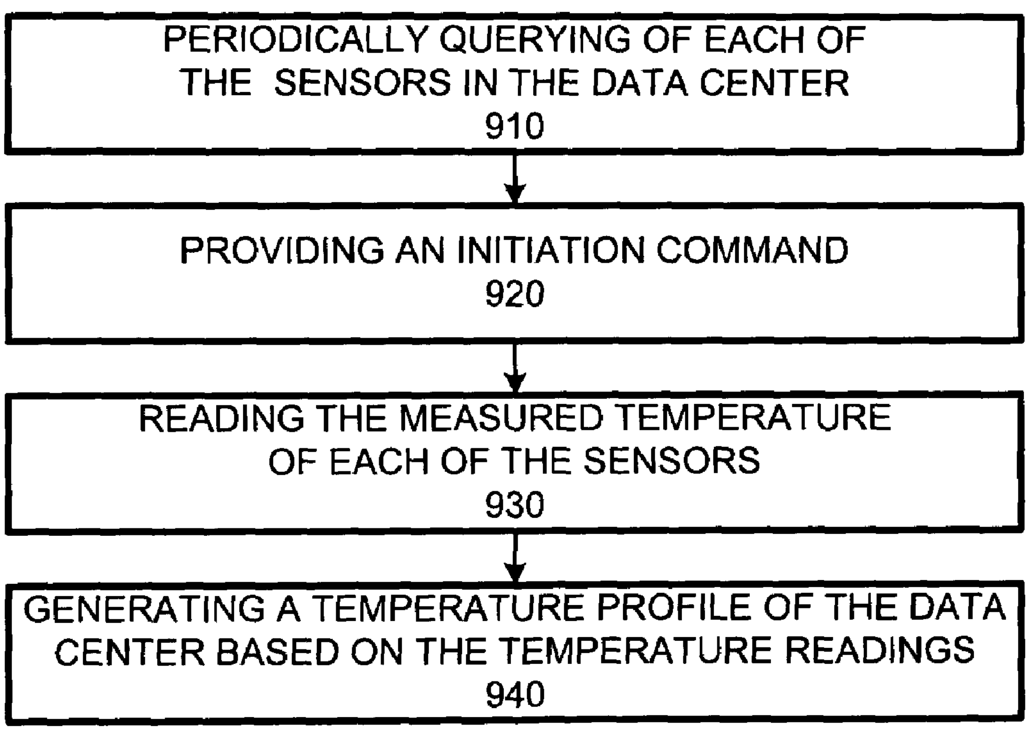
FIG. 9 is a flowchart of a method in accordance with an embodiment of the present invention.

For a better understanding above described embodiment, please refer to FIG. 9. FIG. 9 is a flowchart of a method in accordance with an embodiment. A first step 910 includes periodically querying of each of the sensors in the data center. A second step 920 includes providing an initiation command. A third step 930 includes reading the measured temperature of each of the sensors. A final step 940 involves generating a temperature profile of the data center based on the temperature readings. In an embodiment, the temperature profile includes a variety of profiles based on the locations of the sensors and can be presented in a 3-dimensional matrix view format.

The above-described embodiment may also be implemented, for example, by operating a computer system to execute a sequence of machine-readable instructions. The instructions may reside in various types of computer readable media. In this respect, another aspect concerns a programmed product, comprising computer readable media tangibly embodying a program of machine-readable instructions executable by a digital data processor.

This computer readable media may comprise, for example, RAM contained within the system. Alternatively, the instructions may be contained in another computer readable media and directly or indirectly accessed by the computer system. Whether contained in the computer system or elsewhere, the instructions may be stored on a variety of machine readable storage media, such as a Direct Access Storage Device (DASD) (e.g., a conventional "hard drive" or a RAID array), magnetic data storage diskette, magnetic tape, electronic non-volatile memory, an optical storage device (for example, CD ROM, WORM, DVD), or other suitable computer readable media including transmission media such as digital, analog, and wireless communication links. The machine-readable instructions may comprise lines of compiled C, C++, java, or similar language code commonly used by those skilled in the programming for this type of application arts.

A method and system for collecting temperature data is disclosed that utilizes a plurality of temperature sensors, located at various locations throughout the data center, to dynamically collect temperature data at various locations within the data center. Accordingly, by dynamically collecting temperature data at various locations within the data center, the cooling resources of the data center can be allocated based on the actual cooling requirements of the data center. As a result of the use of the method and system, a substantial savings in operational costs related to the operation of the data center cooling resources is achieved.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed:

1. A method for collecting temperature data in a computer facility including a group of computer systems, each computer system including a computer rack, the method comprising: coupling a plurality of sensors to each computer rack at locations that allow cooling requirements of the facility to be determined; and connecting the plurality of sensors to a central system, wherein a dedicated temperature collection module and a dedicated sensor bus are provided for each group of computer systems; and wherein the sensors of each group are connected to the central system via their dedicated bus and their dedicated temperature collection module.

2. The method of claim 1 wherein coupling a plurality of sensors to at least one of the systems further comprises:

connecting each of the plurality of sensors to the at least one of the systems via a flexible stalk.

3. The method of claim 1, wherein the dedicated buses are 1-wire buses.

4. A method for collecting temperature data in a computer facility including a plurality of computer systems, each computer system including a computer rack, the method comprising: coupling a plurality of sensors to each of the computer systems at locations that allow cooling requirements of the facility to be determined; and connecting each of the plurality of sensors to a central system; wherein the computer systems are arranged in multiple rows of racks, wherein a dedicated temperature collection module and a dedicated sensor bus are provided for each row; wherein coupling the sensors includes coupling multiple sensors to each row of racks; and wherein connecting the sensors includes connecting each row of sensors to its dedicated module via its dedicated bus, and connecting each module to the central system.

5. The method of claim 4 wherein each temperature collection module includes an embedded control for periodically querying the plurality of sensors to create an ambient temperature profile.

6. The method of claim 4, wherein the substations are connected to the central system via an Ethernet connection.

7. The method of claim 4, further comprising identifying the sensors to their dedicated temperature collection modules.

8. A method for collecting temperature data in a facility including a plurality of systems, the method comprising:

coupling a plurality of sensors to each of the systems;

grouping the systems into multiple groups, each group having a dedicated one-wire bus and a dedicated temperature collection module;

connecting each group of sensors to its dedicated module via its dedicated one-wire bus; and connecting each temperature collection module to a central processing system.

* * * * *